United States Patent [19]

Iff et al.

[11] Patent Number: 4,933,437

[45] Date of Patent: Jun. 12, 1990

[54] PREPARATION OF 1:2 CHROMIUM COMPLEX AZO DYES ASYMMETRICALLY SUBSTITUTED WITH SOLUBILIZING GROUPS

[75] Inventors: Walter Iff, Craponne; Daniel Parisot, Saint-Genis-Laval; Hans Schaller, Lyons, all of France

[73] Assignee: Ciba-Geigy Corporation, Ardsley, N.Y.

[21] Appl. No.: 29,363

[22] Filed: Mar. 23, 1987

Related U.S. Application Data

[63] Continuation of Ser. No. 707,918, Mar. 4, 1985, abandoned.

[30] Foreign Application Priority Data

Mar. 8, 1984 [CH] Switzerland .................... 1147/84

[51] Int. Cl.$^5$ ............... C09B 45/16; C09B 45/02; C09P 45/06
[52] U.S. Cl. .................... 534/602; 534/696; 534/697; 534/698; 534/699; 534/887
[58] Field of Search ............... 534/602, 696, 698, 699

[56] References Cited

U.S. PATENT DOCUMENTS

| | | | |
|---|---|---|---|
| 2,906,746 | 9/1959 | Brassel et al. | 534/602 X |
| 2,985,646 | 5/1961 | Schetty et al. | 534/698 |
| 3,432,485 | 3/1969 | Neier | 534/602 X |
| 3,939,140 | 2/1976 | Meininger et al. | 534/602 X |
| 4,083,839 | 4/1978 | Back et al. | 534/602 X |
| 4,234,479 | 11/1980 | Mennicke et al. | 534/698 |
| 4,396,544 | 8/1983 | Dore | 534/602 X |

FOREIGN PATENT DOCUMENTS

| | | | |
|---|---|---|---|
| 0044937 | 2/1982 | European Pat. Off. | 534/697 |
| 1040664 | 10/1953 | France | 534/602 X |
| 151003 | 9/1981 | German Democratic Rep. | 534/696 |
| 967011 | 8/1964 | United Kingdom | 534/602 X |
| 1163713 | 9/1969 | United Kingdom | 534/696 |

OTHER PUBLICATIONS

Rompps, Chemie Lexikon, Neumuller (1979).
Beffa et al, "Review of Progress in Coloration", vol. 14, pp. 33 to 42 (1984).
"Metal-Complex Dyes for Wool and Nylon–1930 to Date", from Review of Progress in Coloration, vol. 14, 33–42 (1984), Beffa et al.

*Primary Examiner*—Floyd D. Higel
*Attorney, Agent, or Firm*—George R. Dohmann; Edward M. Roberts

[57] ABSTRACT

The invention relates to a process for the preparation of asymmetrical 1:2 chromium complex azo dyes of not less than 90% purity and containing at least one water-solubilizing group, which process comprises reacting a mixture of two metallizable azo dyes that contain identical diazo components or identical coupling components, in the molar ratio of 0.85:1.0 to 1.2:1.0, with the proviso that only one of said two azo dyes contains at least one water-solubilizing group, with a chromium donor, under pressure and at a temperature above 100° C. and in the pH range from 0 to 2, and subsequently carrying out further reaction in a weakly acid, neutral or weakly alkaline pH range, utilizing a single vessel for all steps The dyes obtained by the process of the invention are particularly suitable for dyeing wool or polyamide materials.

28 Claims, No Drawings

PREPARATION OF 1:2 CHROMIUM COMPLEX AZO DYES ASYMMETRICALLY SUBSTITUTED WITH SOLUBILIZING GROUPS

This application is a continuation of application Ser. No. 707,918, filed Mar. 4, 1985, now abandoned.

Chromium complex dyes have long been known in the art and are widely used for dyeing and printing textiles made from fibre materials in a very wide range of shades. The known processes for the preparation of 1:1, symmetrical 1:2, mixed 1:2 and pure asymmetrical 1:2 chromium complex azo dyes differ from one another in characteristic manner. Thus 1:1 chromium complex azo dyes are prepared by metallising the azo dyes, which are present in aqueous solution, with excess chromium(III) salts, while holding the pH at about 1 to 2 in order to prevent the formation of 1:2 complexes. Symmetrical and mixed 1:2 chromium complex azo dyes are normally prepared in aqueous solution in a weakly acid, neutral or weakly alkaline pH range, in which process the mixed 1:2 complexes are composed of the symmetrical and the asymmetrical complex. Up to now, it is only been possible to prepare pure asymmetrical 1:2 chromium complex azo dyes by the addition method from corresponding previously prepared 1:1 chromium complex azo dyes and metal-free azo or azomethine dyes.

Despite the complicated process for their preparation, pure asymmetrical 1:2 chromium complex azo dyes have attained great importance, as these dyes afford advantages in mild dyeing methods compared with the 1:1 chromium complexes, advantages with respect to solubility compared with the symmetrical 1:2 chromium complexes, and advantages as regards brilliance of shade compared with the 1:2 chromium mixed complexes. Along with these advantages of the pure asymmetrical chromium complex azo dyes goes the complicated multi-step preparatory process: separate preparation of the nonmetallised azo dyes, preparation of a 1:1 chromium complex azo dye and isolation thereof, and reaction of the 1:1 complex with the metal-free azo dye, with strict observance of the quantitative ratios.

The present invention has for its object to provide a novel process for the preparation of substantially pure asymmetrical 1:2 chromium complex azo dyes, which process makes it possible to effect chroming utilising a single vessel for all steps and is thus superior to the two-step or multi-step chroming method conventionally employed hitherto, and which affords dyes of such purity that they conform to present day requirements with respect to quality.

It has been found that this object is achieved with the process described hereinafter.

Accordingly, the present invention relates to a process for the preparation of asymmetrical 1:2 chromium complex azo dyes of not less than 90% purity, preferably of 95% purity, and containing at least one water-solubilising group, which process comprises reacting a mixture of two metallisable azo dyes that contain identical diazo components or identical coupling components, in the molar ratio of 0.85:1.0 to 1.2:1.0, with the proviso that only one of said two azo dyes contains at least one water-solubilising group, with a chromium donor, under pressure and at a temperature above 100° C. and in the pH range from 0 to 2, and subsequently carrying out further reaction in a weakly acid, neutral or weakly alkaline pH range, utilising a single vessel for all steps.

Surprisingly, the process of this invention makes it possible to prepare almost pure 1:2 chromium complex azo dyes by means of a chroming method utilising a single vessel for both chroming steps, which dyes contain less than 10% of symmetrical 1:2 chromium complexes. Compared with the prior art, this single vessel chroming process constitutes a considerable simplification in the preparation of asymmetrical 1:2 chromium complexes.

Particularly preferred embodiments of the process of this invention comprise:

(a) choosing as temperature above 100° C. a temperature in the range from 100° to 150° C., preferably from 125° to 135° C.;

(b) choosing as pH value from 0 to 2 a pH from 0 to 1, preferably 0.3 to 0.7;

(c) carrying out the reaction in a weakly acid, neutral or weakly alkaline pH range at a temperature below 100° C., preferably in the range from 70° to 100° C. and, most preferably in the range from 90° to 95° C.;

(d) choosing as weakly acid, neutral or weakly alkaline pH range a pH range from 5 to 9, preferably from 6 to 8;

(e) using a mixture of two different metallisable azo dyes as defined herein in the molar ratio of 0.95:1.0 to 1.05:1.0, preferably in the ratio of 1:1;

(f) effecting chroming under a pressure of 1 to 5 bar, preferably of 1 to 3 bar;

(g) using an excess of 1 to 5 mol % of chromium donor.

The reaction of the metal-free azo dyes with the chromium donor is preferably carried out in aqueous medium in a closed vessel, under pressure.

Suitable chromium donors are chromium salts of inorganic or organic acids, for example chromium(III) fluoride, chromium(III) chloride, chromium(III) carbonate and, in particular, chromium compounds of aliphatic or aromatic oxycarboxylic acids that contain the chromium atom bound in complex linkage, for example lactic acid, citric acid, glycolic acid, tartaric acid and salicyclic acid. If inorganic chromium salts are used in the process of this invention, the chroming is preferably performed in the presence of a catalytic amount of a complexing assistant such as tartaric acid, lactic acid, citric acid or glycolic acid or, in particular, salicyclic acid.

The chroming can, if desired, be performed in the presence of suitable auxiliaries such as salts of inorganic or organic acids, for example sodium or potassium acetate, sodium or potassium carbonate, sodium or potassium bicarbonate.

The procedure for chroming the reaction mixture according to the process of this invention comprises adjusting the pH with a strong acid, preferably an inorganic acid, for example sulfuric acid, to a value from 0 to 2, heating the reaction mixture, under pressure, to a temperature above 100° C. and holding this temperature for a time, preferably from 2 to 10 hours, most preferably from 4 to 8 hours, then cooling the reaction mixture to a temperature preferably below 100° C. and adjusting the pH to a weakly acid, neutral or weakly alkaline value by addition of alkali, for example sodium carbonate, and carrying out the reaction further for a short time, preferably for 10 minutes to 3 hours, most preferably for 30 to 90 minutes. The isolation of the not less than 90% pure asymmetrical 1:2 chromium complex azo dye can be effected by methods that are known per se, for example salting out, filtration and subsequent drying.

The dyes obtained by the process of this invention are either in the form of the free acid or, preferably, of salts.

Possible salts are, for example, the alkali metal, alkaline earth metal or ammonium salts or the salts of an organic amine. Examples of such salts are the sodium, lithium, potassium or ammonium salts or the salt of triethanolamine.

Further preferred embodiments of the process of this invention comprise:

(a) diazotising two diazotisable amines that differ at least from each other in that only one contains a water-solubilising group and which contain a matallisable group vicinal to the amino group, and coupling the diazonium salt to the 1.8- to 2.2-fold molar amount of a coupling component that contains no water-solubilising groups and contains a metallisable group vicinal to the coupling site, and subsequently chroming in accordance with the procedure described above, utilising a single vessel for diazotising, coupling and chroming;

(b) diazotising a diazotisable amine that contains no water-solubilising groups and contains a metallisable group vicinal to the amino group, and coupling the diazonium salt to half the molar amount of each of two coupling components that differ at least from each other in that only one contains a water-solubilising group and which each contain a metallisable group vicinal to the coupling site, and subsequently chroming in accordance with the procedure described above, utilising a single vessel for diazotising, coupling and chroming;

(c) diazotising separately two diazotisable amines that differ at least from each other in that only one contains a water-solubilising group and which contain a metallisable group vicinal to the amino group, and coupling both diazonium salts to the 1.8- to 2.2-fold molar amount of a coupling component that contains no water-solubilising groups and contains a metallisable group vicinal to the coupling site, and subsequently chroming in accordance with the procedure described above; or (d) starting from two separately prepared azo dyes that correspond to the requirements specified above.

A further simplification of the process is achieved with the above preferred variants (a) to (c), as diazotisation, coupling and chroming [variants (a) and (b)] or coupling and chroming [variant (c)] can be carried out in a single vessel.

The diazotisation of the diazo components is carried out by methods known per se, for example by treatment with nitric acid in an aqueous solution of mineral acid at low temperature. The coupling to the coupling component is likewise carried out by methods known per se, for example at acid, neutral or alkaline pH values.

The metallisable azo dyes employed in the process of this invention and the diazo and coupling components contain, as metallisable groups, preferably hydroxyl groups and/or carboxyl groups. One of the dyes employed must contain at least one water-solubilising group, for example a sulfone, sulfonamide, N-monoalkylsulfonamide or N,N-dialkylsulfonamide group or, preferably, a sulfonic acid group.

A suitable sulfone group is an alkylsulfone group, preferably a $C_1$-$C_4$alkylsulfone group.

A suitable N-monoalkylsulfonamido or N,N-dialkylsulfonamido group is in particular one containing one or two $C_1$-$C_4$alkyl radicals.

The metallisable azo dyes employed in the process of this invention are preferably monoazo dyes that contain diazo components and coupling components of the benzene, naphthalene or heterocyclic series.

In the process of this invention it is preferred to use a mixture of azo dyes of the formulae

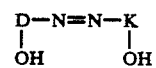  (1)

and

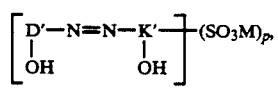  (2)

wherein D and D' are each independently of the other a radical of the benzene or naphthalene series which can be substituted by $C_1$-$C_4$alkyl, $C_1$-$C_4$alkoxy, halogen or nitro, and K and K' are each independently of the other a naphthalene or pyrazolone radical which can be substituted by $C_1$-$C_4$alkyl, $C_1$-$C_4$alkoxy, halogen or nitro, and wherein the hydroxyl groups are vicinal to the azo group, M is a cation, and D and D', or K and K' are identical radicals and p is 1 or 2.

A particularly preferred embodiment of the process of this invention comprises using a dye of formula (1), wherein D is a radical of the benzene series which may be substituted by nitro or chlorine, and K is a 1-phenyl-3-methylpyrazol-5-one radical or a radical of the naphthalene series, and a dye of formula (2), wherein D' is a radical of the benzene series which is substituted by nitro, chlorine, or optionally sulfo, or is a radical of the naphthalene series which is substituted by nitro or optionally sulfo, and K' is a 1-phenyl-3-methylpyrazol-5-one radical or a radical of the naphthalene series which is unsubstituted or substituted by sulfo, which radical of the formula (2) contains a single sulfonic acid group.

The starting materials employed in the process of this invention are diazo components and coupling components or azo dyes obtained therefrom, with the proviso that the azo dyes contain identical diazo components or identical coupling components and that only one of the two azo dyes contains at least one water-solubilising group.

The azo dyes employed in the process of this invention are known and are prepared by methods that are known per se.

Examples of suitable diazo components are those of the benzene or naphthalene series which, in addition to containing the metallisable group and, where appropriate, a water-solubilising group, can also contain further substituents of a non-salt-forming kind, for example nitro groups, halogen atoms such as fluorine, chlorine and bromine, alkyl groups, preferably $C_1$-$C_4$alkyl groups, for example methyl, ethyl, propyl, isopropyl, butyl, isobutyl, sec-butyl and tert-butyl, alkoxy groups, preferably $C_1$-$C_4$alkoxy groups, for example methoxy, ethoxy, propoxy, isopropoxy and butoxy.

Typical examples of such diazo components are: 4- or 5-chloro-2-aminophenol, 4-, 5- or 6-nitro-2-aminophenol, 4,6-dichloro-2-aminophenol, 3,4,6-trichloro-2-aminophenol, 4-chloro-5- or -6-nitro-2-aminophenol, 4-nitro-6-chloro-2-aminophenol, 4,6-dinitro-2-aminophenol, 1-amino-2-hydroxynaphthalene, 2-amino-1-hydroxybenzene-4- or -5-sulfophenylamid, 4-chloro-2-amino-1-hydroxybenzene-5-sulfophenyl-or -N-ethyl-N-phenylamide, 2-aminobenzene-1-carboxylic acid, 2-aminobenzene-1-carboxylic acid 4- or -5-sulfonic acid, 2-aminophenol-4- or -5-sulfonic acid, 4-chloro- or 4-methyl-2-aminophenol-5- or -6-sulfonic acid, 4-nitro-2-aminophenol-6-sulfonic acid, 6-nitro-2-aminophenol-4-sulfonic acid, 2-amino-1-hydroxynaphthalene-4- or -8-sulfonic acid, 6-nitro-1-amino-2-hydroxynaphthalene-4-sulfonic acid, 6-bromo- or 6-methyl-1-amino-2-hydroxynaphthalene-4-sulfonic acid, 1-amino-2-hydroxynaphthalene-4-sulfonic acid, 4-chloro- or 4-nitro-2-aminophenol-6-sulfonamide, 6-nitro-2-aminophenol-4-sulfonamide, 2-aminophenol-4- or -5-sulfo-N-methylamide, 2-aminophenol-4- or -5-sulfo-N-phenylamide, 2-aminophenol-4- or -5-sulfo-N,N-dimethylamide, 4-chloro-2-aminophenol-5-sulfo-N-methyl-, -N-ethyl-, -N-isopropyl- or -N-phenylamide, 4-chloro-2-aminophenol-5-sulfo-N,N-dimethyl-, -N,N-diethyl- or N-methyl-N-phenylamide, and the corresponding compounds which contain a methylsulfone, ethylsulfone, phenylsulfone, p-methylsulfone or p-chlorophenylsulfone group instead of a sulfonamido group.

Suitable coupling components are those that are able to couple in the vicinal position to a hydroxyl or carboxyl group. Such coupling components also include keto compounds that are able to couple in the vicinal position to their enolised or enolisable keto group. Suitable coupling components are in particular those of the benzene, naphthalene or heterocyclic series that, in addition to containing the metallisable group and, where appropriate, a water-solubilising group, can contain further substituents of a non-salt-forming kind as described for the diazo components.

Typical examples of such coupling components are: p-cresol, p-tert-amylphenol, 1-phenyl-3-methyl-5-pyrazolone, 1-(2'-naphthylphenyl)-3-methyl-5-pyrazolone, 1,3-diphenyl-5-pyrazolone, 1-(2'-,3'- or 4'-chlorophenyl)-3-methyl-5-pyrazolone, 1-(2',5'-dichlorophenyl)-3-methyl-5-pyrazolone, 1-(2'-,3'- or 4'-methylphenyl)-3-methyl-5-pyrazolone, 1-n-octyl-3-methyl-5-pyrazolone, 8-hydroxyquinoline, barbituric acid, 5-bromo-, 6-methyl- or 6-methoxy-2-hydroxynaphthalene, 8-chloro-1-hydroxynaphthalene, 5-chloro-1-hydroxynaphthalene, 5,8-dichloro-1-hydroxynaphthalene, 4,8- or 5,8-dichloro-2-hydroxynaphthalene, 2-hydroxynaphthalene, 1-hydroxynaphthalene, 1-phenyl-3-methyl-5-pyrazolone-2'-, -3'- or -4'-sulfonic acid, 1-(2'-chloro-4'- or -5'-sulfophenyl)-3-methyl-5-pyrazolone, 1-(2',5'-dichloro-4'-sulfophenyl)-3-methyl-5-pyrazolone, 1-[naphthyl(1)]-3-methyl-5-pyrazolone-4'-, -5'-, -6'-, -7'- or -8'-sulfonic acid, 1-[naphthyl-(2')]-3-methyl-5-pyrazolone-1'- or -8'-sulfonic acid, 2-hydroxynaphthalene-4-, -5-, -6 or -7-sulfonic acid, 1-hydroxynaphthalene-4-, -5- or -8-sulfonic acid, 1-phenyl-3-methyl-5-pyrazolone-3'-sulfonamide or -N-methylsulfonamide, 2,4-dihydroxyquinoline, 5-chloro-8-hydroxyquinoline, 1-hydroxynaphthalene-4-, -5- or -8-sulfonamide, 2-hydroxynaphthalene-4-, -6- or -7-sulfonamide.

A further embodiment of the process of this invention comprises pretreating, prior to the chroming at pH 0 to 2, a mixture of the above defined metallisable starting dyes in the molar ratio of 0.85:1.0 to 1.2:1.0, with a chromium donor at pH 3 to 4, and subsequently further carrying out the reaction as described above, i.e. under pressure at a temperature above 100° C. and in the pH range from 0 to 2, and then carrying out further reaction at a weakly acid, neutral or weakly alkaline pH value, utilising a single vessel.

An advantage of the above-described pretreatment at pH 3 to 4 of the process of this invention is that, especially when employing starting dyes that react only very slowly at a pH in the range from 0 to 2 with a chromium donor, a shortening of the reaction time is thereby achieved.

The purity of the asymmetrical 1:2 chromium complex azo dyes obtained by the process of this invention is such as has been previously achieved only with the complexes prepared by the addition method.

1:2 Chromium complexes are obtained in over 95% purity by the process of this invention, especially when using the reactants in a molar ratio of 1:1. Deviations from the molar ratio of 1:1 are used to adjust the desired shade.

The asymmetrical 1:2 chromium complex azo dyes obtained by the process of this invention are suitable for dyeing and printing a very wide range of materials, in particular for dyeing materials of animal origin such as silk, leather and, in particular, wool, and also for dyeing and printing synthetic fibres made from polyamide, polyurethanes or polyacrylonitrile. They are particularly suitable for dyeing from a weakly alkaline, neutral or weakly acidic bath, preferably from a bath containing acetic acid. The dyeings so obtained are level, very brilliant, and have good allround fastness properties, especially good lightfastness and wetfastness properties.

The textile material can be in the most widely different kinds of processing forms, for example in the form of filaments, yarn, woven and knitted fabrics.

In the following Examples, parts are by weight. The relationship between parts by weight and parts by volume is the same as that between the gram and the cubic centimeter.

EXAMPLE 1

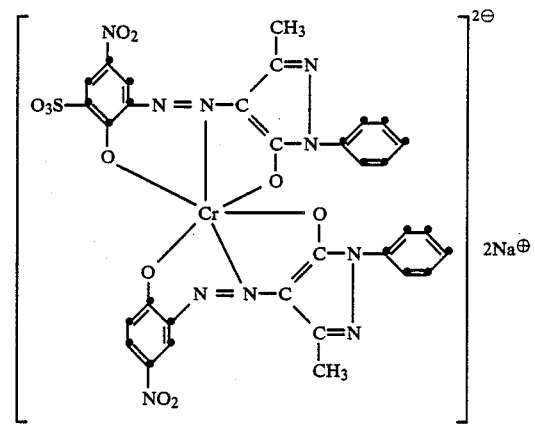

246 parts of 2-amino-4-nitrophenol-6-sulfonic acid are dissolved in 3000 parts of water and to this solution are added 200 parts of 10N hydrochloric acid. This solution is cooled with about 1000 parts of ice to 6°-8° C. To the solution are then added 210 parts of a 5N sodium nitrite solution, during which addition the temperature may not exceed 12° C. The reaction mixture is stirred for 1 hour and excess nitrite is destroyed with sulfamic acid. Prior to the coupling, the solution is cooled to 10° C. with 150 parts of ice and the pH is adjusted to 3.2 with 45 parts of sodium carbonate in 300 parts of water. (Solution A).

162 parts of 2-amino-4-nitrophenol are dissolved in 1500 parts of water by adding 250 parts of 10N hydrochloric acid and the solution is cooled to 10° C. with about 300 parts of ice. To the solution are added 210 parts of 5N sodium nitrite solution, during which addition the temperature is 15°-20° C. A small excess of nitrite is destroyed with sulfamic acid. (Solution B).

Solution A is added to a solution of 380 parts of 1-phenyl-3-methyl-5-pyrazolone in 4000 parts of water, which solution has been adjusted to pH 4.5 to 5 with 10N hydrochloric acid. During the addition, the maximum temperature may not exceed 5° C. Upon completion of coupling, the pH of the solution is adjusted to 4.5 with sodium carbonate. Then solution B is added. Upon completion of coupling, the pH is adjusted to about 0.5 with 300 parts of 70% sulfuric acid and to the solution are added 20 parts of salicylic acid and 176 parts of chromium(III) sulfate [Cr(OH)SO$_4$]. The solution is heated to 130° C. in a closed apparatus to create a pressure of 1.8 to 2 kg/cm$^3$ and kept for 6 hours at 130° C. When metallisation is complete, the solution is cooled to 90°-95° C. and the pH is adjusted to 7.5 to 8 with 800 parts of 10N sodium hydroxide solution. The solution is stirred for 1 hour, then the dye is salted out with sodium chloride, isolated by filtration, and dried. The dye of the above constitution dyes wool in orange shades of good fastness properties. It is the 96% pure asymmetrical 1:2 chromium complex. The yield is 93%.

EXAMPLE 2

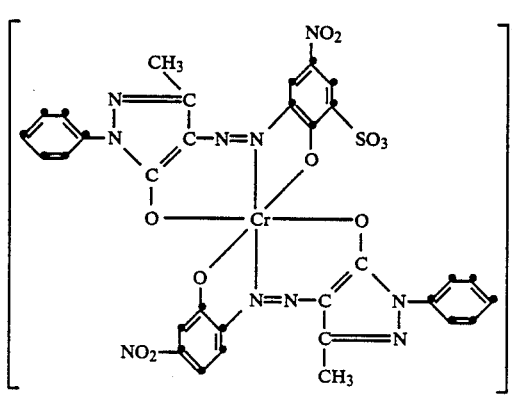

The procedure of Example 1 is repeated, using as solution B a solution containing 162 parts of 2-amino-5-nitrophenol instead of 2-amino-4-nitrophenol. The resultant dye of the above constitution dyes wool in red shades. It is the 93% pure asymmetrical 1:2 chromium complex. The yield is 90%.

EXAMPLE 3

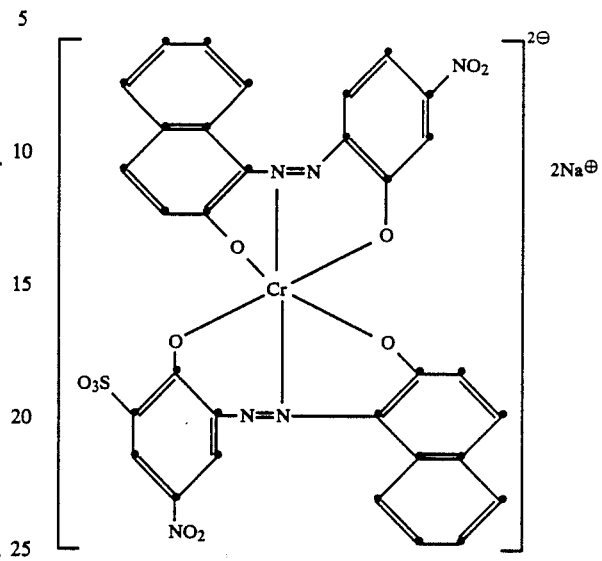

The procedure of Example 2 is repeated, using as coupling component 312 parts of 2-hydroxynaphthalene instead of 300 parts of 1-phenyl-3-methyl-8-pyrazolone. The resultant dye of the above constitution dyes wool in grey shades. It is the 93% pure asymmetrical 1:2 chromium complex. The yield is 92%.

EXAMPLE 4

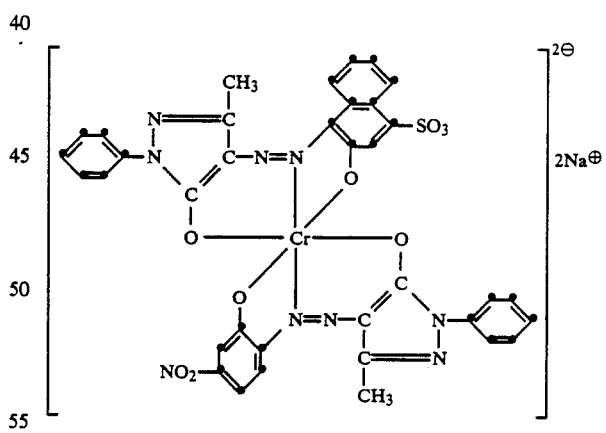

The procedure of Example 1 is repeated, using as solution A a solution containing 245 parts of 1-amino-2-hydroxynaphthalene-4-sulfonic acid instead of 2-amino-4-nitrophenol-6-sulfonic acid, and as solution B, the solution employed in Example 2. The resultant dye of the above constitution dyes wool in red shades. It is the 95% pure asymmetrical 1:2 chromium complex. The yield is 90%.

EXAMPLE 5

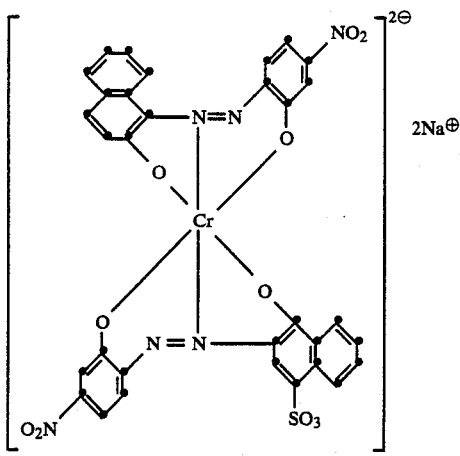

A solution of 300 parts of the azo dye obtained by coupling 5-nitro-2-aminophenol with 2-naphthol and 400 parts of the azo dye obtained by coupling 5-nitro-2-aminophenol with 1-naphthol-4-sulfonic acid is adjusted with 70% sulfuric acid to pH 1 in 10,000 parts of water and then 20 parts of salicylic acid and 155 parts of chromium(III) sulfate are added. The mixture is heated to 130° C. under a pressure of 1.8 to 2 bar and kept for 4 hours at this temperature. The mixture is then cooled to 90° C., adjusted to pH 8 with sodium hydroxide, and stirred for 1 to 2 hours at 90° C. When the reaction is complete, the dye is salted out with sodium chloride, isolated by filtration, and dried. The dye so obtained is the 95% pure asymmetrical 1:2 chromium complex. The yield is 94%. The dye of the above constitution dyes wool in grey shades.

EXAMPLE 6

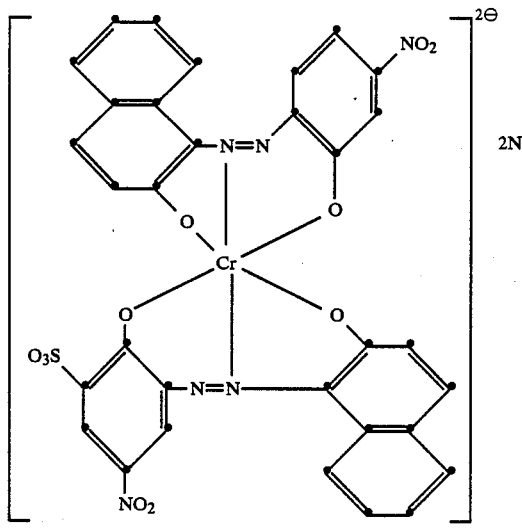

A solution of 30 parts of the azo dye obtained by coupling 5-nitro-2-aminophenol with 2-naphthol and 40 parts of the dye obtained by coupling 4-nitro-2-amino-1-hydroxybenzene-6-sulfonic acid with 2-naphthol is adjusted with 70% sulfuric acid to pH 3.5 in 1000 parts of water and then 2 parts of salicylic acid and 16.6 parts of chromium(III) sulfate are added. The mixture is stirred at pH 3.5 until no more metal-free azo dye can be detected. Then the mixture of 1:2 chromium complexes so obtained is adjusted with 70% sulfuric acid to pH 1 and heated to 130° C. under a pressure of 1.8 to 2 bar and kept at this temperature for 4 hours. The mixture is then cooled to 90° C. and adjusted to pH 7 with sodium hydroxide, then stirred for 1 to 2 hours at 90° C. When the reaction is complete, the dye is salted out with sodium chloride, isolated with filtration and dried. The resultant dye is the 95% pure asymmetrical 1:2 chromium complex. The yield is 92%. The dye so obtained of the above constitution dyes wool or polyamide in grey shades.

DYEING PROCEDURE FOR WOOL 2 parts of the chromium complex dye of Example 1 are dissolved in 4000 parts of water and then 100 parts of thoroughly wetted wool are put into this dye bath at 40°–50° C.

Then 2 parts of 40% acetic acid are added and the bath is heated over ½ hour to the boil and kept for ¾ hour at boiling temperature. The wool is then rinsed with cold water and dried. The orange dyeing has good wetfastness properties and excellent light-fastness.

DYEING PROCEDURE FOR POLYAMIDE 100 parts of nylon 6,6 fabric are put at 50°–60° C. into a dye bath that consists of 3000 parts of water, 5 parts of 40% acetic acid, 10 parts of sodium sulfate and 2 parts of the chromium complex of Example 1. After the bath has been heated to the boil over ½ hour, dyeing is carried out for a further hour at boiling temperature. The fabric is then rinsed and dried, affording a level orange dyeing.

What is claimed is:

1. A process for preparing an asymmetrical 1:2 chromium complex azo dye containing at least one water-solubilizing group, which process comprises:

a. preparing an aqueous mixture of two metallizable azo dyes containing identical diazo components or identical coupling components and containing as diazo components and coupling components benzene, naphthalene heterocyclic radicals which are unsubstituted or substituted by $C_1$–$C_4$alkyl, $C_1$–$C_4$alkoxy, halogen or nitro and which contain hydroxyl groups as metallizable groups, in a molar ratio ranging from 0.85:1.0 to 1.2:1.0, with the proviso that only one of said azo dyes contains at least one $C_1$–$C_4$alkylsulfone, sulfonamide, $-SO_2N(H)$-$C_1$–$C_4$alkyl, $-SO_2N(C_1$–$C_4$alkyl)_2$ or sulfonic acid group as water-solubilizing group;

b. reacting, at a pH of from 0 to 2, at a pressure greater than 1 bar and up to 5 bar, and at a temperature of 100° to 150° C., said mixture with a chromium donor; and c. adjusting the pH to a value of from 5 to 9;

which the provisos that a single reaction vessel is utilized for all steps and the reactant amounts in steps (a) and (b) and the times, temperatures and pressures of steps (b) and (c) are selected to produce the 1:2 asymmetric chromo:azo dye in purity of at least 90%.

2. A process according to claim 1, wherein step (b) is conducted at a temperature from 125° C. to 135° C.

3. A process according to claim 1, wherein the pH of step (b) is a value of from 0 to 1.

4. A process according to claim 3, wherein the pH is a value of from 0.3 to 0.7.

5. A process according to claim 1, wherein the temperature of step (c) is 70° C. to 100° C.

6. A process according to claim 5, wherein the temperature is 90° C. to 95° C.

7. A process according to claim 1, wherein the pH in step (c) is adjusted to a value ranging from 6 to 8.

8. A process according to claim 1, wherein the molar ratio of dyes in step (a) ranges in a value from 0.95:1.0 to 1.05:1.0.

9. A process according to claim 8, wherein the molar ratio of dyes is 1:1.

10. A process according to claim 1, wherein the pressure of step (b) is no more than 3 bar.

11. A process according to claim 1, wherein the amount of chromium donor used is in an excess of 1 to 5 mol %.

12. A process according to claim 1, wherein step (b) is carried out in the presence of a catalytic amount of a complexing assistant selected from the group consisting of tartaric acid, lactic acid, glycolic acid or salicylic acid.

13. A process according to claim 1, wherein step (b) is conducted in aqueous medium.

14. A process according to claim 1, wherein the pH of the mixture of step (a) is from 3 to 4, wherein the pH of the reactant mixture after addition of the chromium donor is from 3 to 4, and wherein the pH of the reactant mixture is subsequently adjusted to a value of from 0 to 2.

15. A process according to claim 1, wherein said chromium donor is selected from the group consisting of chromium(III) fluoride, chloride, carbonate, sulfate, lactate, citrate, glycolate, tartrate and salicylate.

16. A process according to claim 1, which comprises diazotizing two diazotizable amines that differ at least from each other in that only one contains a water-solubilizing group and which contain a metallizable group vicinal to the amino group, and coupling the diazonium salt to the 1.8- to 2.2-fold molar amount of a coupling component that contains no water-solubilizing groups and contains a metallizable group vicinal to the coupling site to prepare the mixture of step (a).

17. A process according to claim 1, which comprises preparing the mixture of step (a) by diazotizing a diazotizable amine that contains no water-solubilizing groups and which contains a metallizable group vicinal to the amino group, and coupling the diazonium salt to half the molar amount of each of two coupling components that differ at least from each other in that only one contains a water-solubilizing group and which each contain a metallizable group vicinal to the coupling site.

18. A process according to claim 1, which comprises preparing the mixture of step (a) by diazotizing separately two diazotizable amines that differ at least from each other in that only one contains a water-solubilizing group and which contain a metallizable group vicinal to the amino group, and coupling both diazonium salts to the 1.8- to 2.2-fold molar amount of a coupling component that contains no water-solubilizing groups and which contains a metallizable group vicinal to the coupling site.

19. A process according to claim 1, wherein said azo dyes contain a sulfonic acid group.

20. A process according to claim 1, wherein the mixture of step (a) is a mixture of azo dyes of the formula

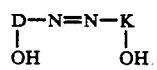

and

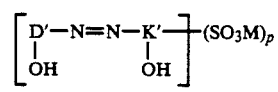

wherein D and D' are each independently of the other a benzene of naphthalene radical which is unsubstituted or substituted by $C_1$-$C_4$alkyl, $C_1$-$C_4$alkoxy, halogen or nitro, and K and K' are each independently of the other a naphthalene or pyrazolone radical which is unsubstituted of substituted by $C_1$-$C_4$alkyl, $C_1$-$C_4$alkoxy, halogen or nitro, and wherein the hydroxyl groups are vicinal to the azo group, M is a cation, and D and D' or K and K' are identical radicals, and p is 1 or 2.

21. A process according to claim 20, wherein D is a benzene radical which is substituted by nitro or chlorine, and K is a 1-phenyl-3-methylpyrazol-5-one or naphthalene radical, D' is a benzene radical which is substituted by nitro, chlorine, methyl or sulfo, or is a naphthalene radical which is substituted by nitro or sulfo, and K' is a 1-phenyl-3-methylpyrazol-5-one radical, or a naphthalene radical which is unsubstituted or substituted by sulfo, with the proviso that the dye with D, contains a single sulfonic acid group.

22. A process according to claim 1, wherein an asymmetrical 1:2 chromium complex azo dye is obtained in at least 95% purity.

23. A process according to claim 20, wherein said azo dyes in the mixture are

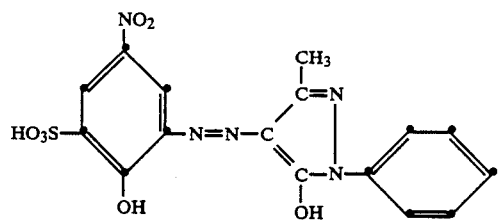

and

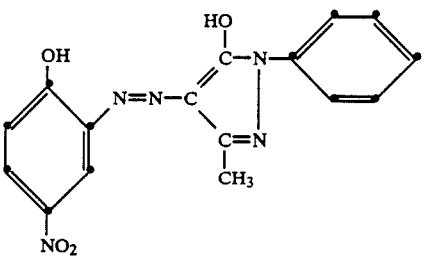

24. A process according to claim 20, wherein said azo dyes in the mixture are

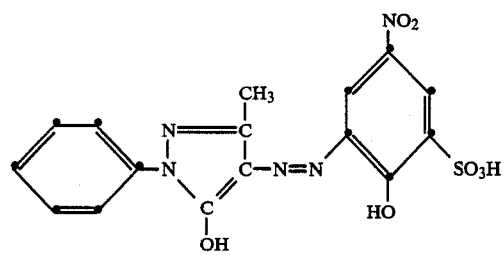
and
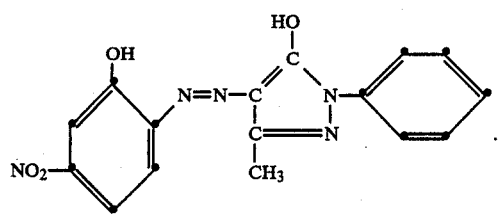
25. A process according to claim 20, wherein the azo dyes in the mixture are
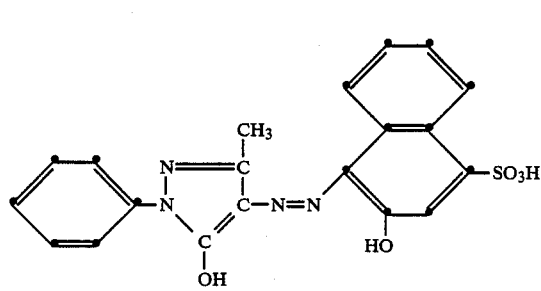
and
26. A process according to claim 20, wherein the azo dyes in the mixture are
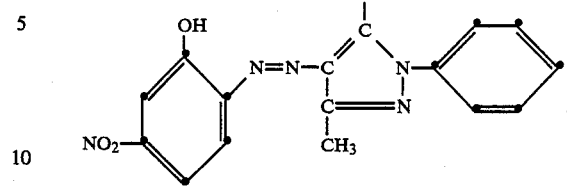
-continued
and
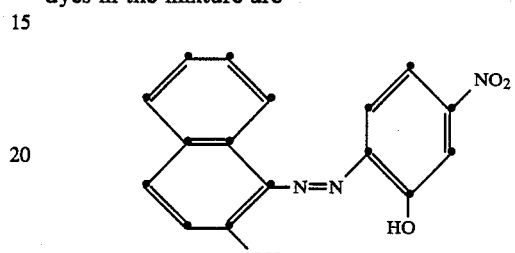
27. A process according to claim 20, wherein the azo dyes in the mixture are
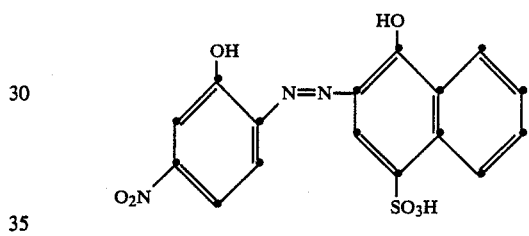
and
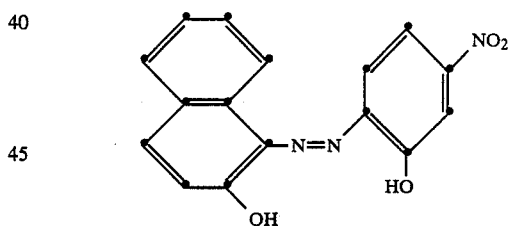
28. A process according to claim 20, wherein the azo dyes in the mixture are
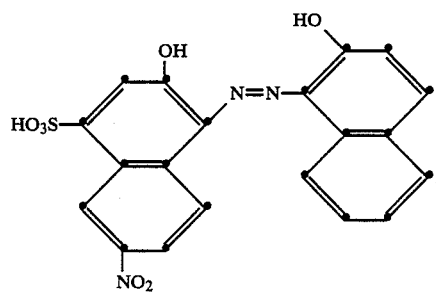
and
and
* * * * *